United States Patent [19]
Schweiger et al.

[11] 3,979,258
[45] Sept. 7, 1976

[54] NUCLEAR REACTOR

[75] Inventors: Fritz Schweiger, Hagen; Erwin Glahe, Uentrop, Unna, both of Germany

[73] Assignee: Hochtemperatur-Kernkraftwerke GmbH (HKG) Gemeinsames Europaisches Unternehmen, Uentrop, Germany

[22] Filed: Apr. 1, 1974

[21] Appl. No.: 456,850

Related U.S. Application Data

[63] Continuation of Ser. No. 234,632, March 14, 1972, abandoned.

[30] Foreign Application Priority Data

Mar. 16, 1971 Germany............................. 2112472
Nov. 24, 1971 Germany............................. 2158178

[52] U.S. Cl. ............................... 176/86 R; 176/36 R
[51] Int. Cl.² .......................................... G21C 7/10
[58] Field of Search ............................ 176/36, 86 R

[56] References Cited
UNITED STATES PATENTS

| | | |
|---|---|---|
| 2,975,119 | 3/1961 | Emmons ............................ 176/36 |
| 3,050,943 | 8/1962 | Thorel et al. ......................... 176/36 |
| 3,519,536 | 7/1970 | Rausch ............................. 176/86 R |
| 3,751,336 | 8/1973 | Angelini et al .................... 176/86 R |

FOREIGN PATENTS OR APPLICATIONS 1,204,938  9/1970  United Kingdom............... 176/86 R

*Primary Examiner*—Harvey E. Behrend
*Attorney, Agent, or Firm*—Toren, McGeady and Stanger

[57] ABSTRACT

In a nuclear reactor of the kind which is charged with spherical reaction elements and in which control rods are arranged to be thrust directly into the charge, each control rod has at least one screw thread on its external surface so that as the rod is thrust into the charge it is caused to rotate and thus make penetration easier. The length of each control rod may have two distinct portions, a latter portion which carries a screw thread and a lead-in portion which is shorter than the latter portion and which may carry a thread of greater pitch than that on the latter portion or may have a number of axially extending ribs instead of a thread.

5 Claims, 6 Drawing Figures

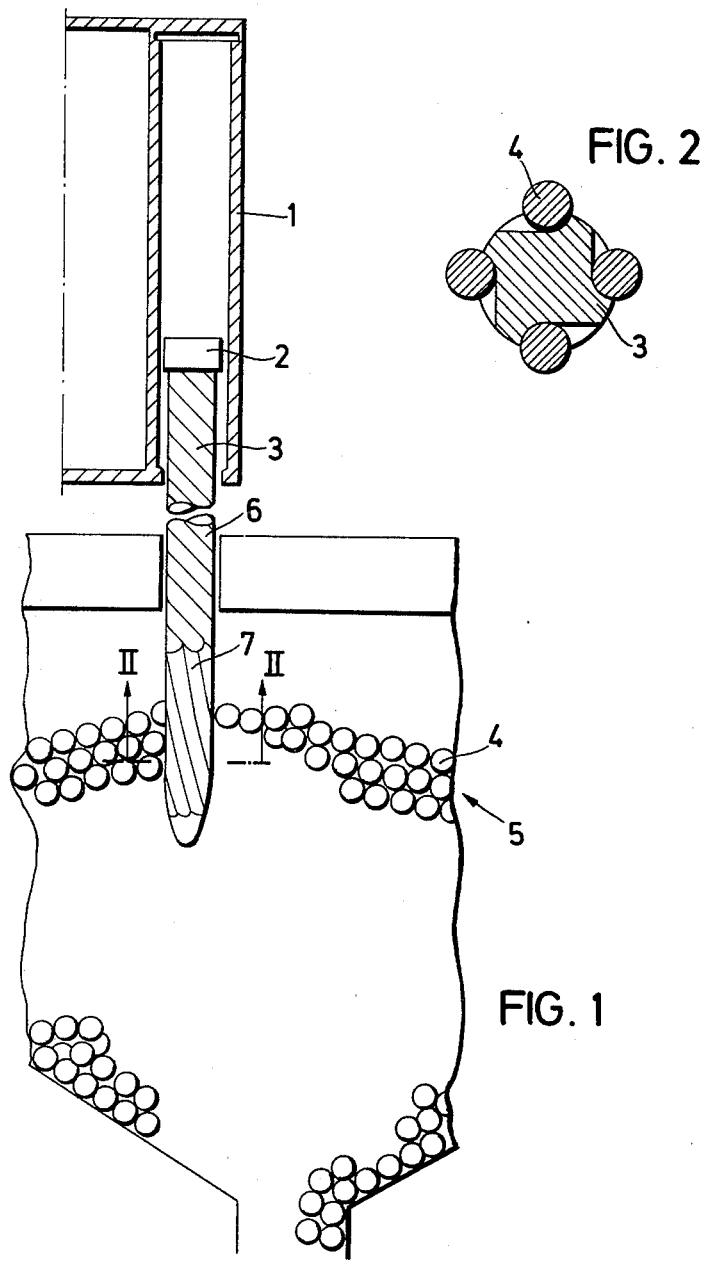

NUCLEAR REACTOR

This is a continuation of application Ser. No. 234,632 filed on Mar. 14, 1972, now abandoned.

The invention relates to nuclear reactors of the kind which are charged with spherical reaction elements and in which control rods are arranged to be thrust directly into the charge.

In the operation of nuclear reactors which are charged with a bulk charge consisting of spherical reaction elements the problem arises that control rods in the reflector are not in themselves sufficient to keep the reactor, for example a power reactor, operating below the critical temperature. It is therefore necessary to provide extra control rods which are thrust either directly or indirectly into the bulk charge. Using the indirect method the rods are for example guided in bores in graphite noses which themselves penetrate into the charge. Using the direct method, on the other hand, each control rod is thrust directly into the charge of spherical reaction elements, for example by means of a piston working in a pneumatic cylinder. During the penetration of the rod into the charge a rounded nose on the rod thrusts the spherical elements sideways out of the way. During deeper penetration of the rod the spherical reaction elements can become stressed mechanically so greatly that they are damaged. A further disadvantage is that repeated penetration and withdrawal of the rods results in an undesired compacting of the charge. Furthermore the control rods themselves may be stressed sideways to an undesired degree.

With the aim of reducing the mechanical stresses which are applied to the reaction elements and to the control rods when the rods are thrust into the charge of the elements, according to the invention, in a reactor of the kind described, each control rod which is arranged to be thrust directly into the charge has at least one screw thread on its external surface. The effect obtained is that during penetration of the rods into the charge each rod rotates, drive being applied tangentially to the rod as a result of the charge acting on the thread as the rod is advanced. The rotational driving effect is increased by the fact that the reaction elements, which are mainly graphite, have a high coefficient of friction because they are immersed in an ambient atmosphere of pure helium. The rotation of the control rods enable them to penetrate the charge more easily, the reaction elements being pushed aside by the threads. The elements and rods are stressed less than in conventional reactors of this type, and the charge also remains more loosely packed.

During the penetration of the rods into the charge the greatest mechanical stress is applied to the elements which are most directly in line with the axes of the rods, the worst case occurring when a rod axis passes through the centre of a sphere.

An advantageous construction in accordance with the invention comprises each control rod having a thread on its leading section having a greater pitch than a thread on the remaining length of the rod. With this arrangement, the leading section of each rod penetrates the charge relatively easily, the greater pitch thread causing only slight rotation, but as the rod penetrates deeper and resistance becomes greater, the trailing thread of lesser pitch causes the rotation to increase and thus facilitate penetration. The leading section which is thus rotated more than its own thread would otherwise cause tends to push the deeper elements sideways and upwards which tends to loosen the path for the rod.

Preferably the axial length of the thread of greater pitch is limited to the ratio of 360° to the number of threads. This limitation ensures that the part of the rod which has a thread of lesser pitch is considerably longer than the part where the thread has a greater pitch. This ensures that the rod rotates sufficiently rapidly.

A further advantage provided by the construction in accordance with the invention is that, due to the rotation, the control rods penetrate straighter into the charge and are therefore subjected to less bending stress. It should be observed that this effect is obtained without it being necessary to provide any external drive for rotating the rods and consequently there are no extra sealing and lubricating problems.

As an alternative to having a helical thread on the leading section of each control rod, this section may be provided with a number of ribs extending axially along the section, the screw thread or threads being on the remaining length of the rod. This arrangement makes it even easier to drive the rod initially into the upper layers of the charge, without fracturing or excessively abrading the reaction elements and facilitates control of the rod movement. When the rod initially penetrates the charge it does not yet rotate, the ribs near the nose of the rod allowing the nose to push the upper elements aside with the least possible friction. When the rod penetrates deeper into the charge the thread or threads on the longer upper part of the rod automatically brings the rod into rotation, the ribs on the leading end of the rod loosening the spheres in the deeper and more densely packed region of the charge. The ribs may be formed integrally with the rod or may be welded on.

A similar effect may be obtained if the leading section of each control rod has an oval or polygonal cross section rather than having distinct ribs.

Examples in accordance with the present invention will now be described with reference to the accompanying drawings, in which:

FIG. 1 is a diagrammatic view of part of a reactor showing a control rod projecting downwards into a bulk charge of spherical reaction elements;

FIG. 2 is a cross section through the control rod, taken along the line II—II in FIG. 1;

Figure 3:
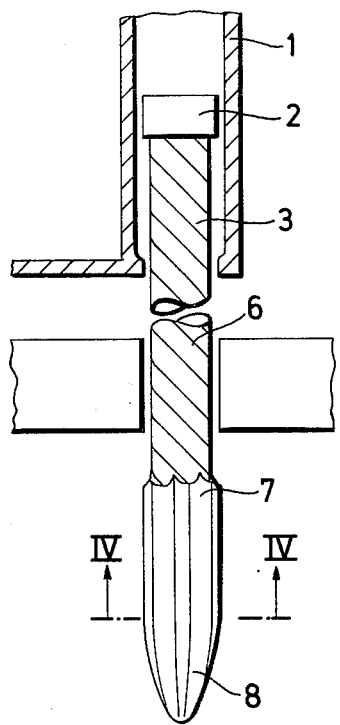
FIG. 3 is a view similar to that of FIG. 1, but illustrating a different form of control rod and not showing the bulk charge.

In the reactor illustrated in FIG. 1, a control rod 3 is fixed to a double-acting piston 2 which works in a cylinder 1. Hydraulic or pneumatic fluid applied in the cylinder at the side of the piston 2 remote from the control rod 3 drives the rod 3 into a bulk charge of spherical reaction elements 4, the rod forcing a path between the elements. The rod 3 is retracted by reversing the hydraulic or pneumatic fluid supply to the cylinder 2. The external surface of the rod 3 has a number of helical screw threads along its length, the threads on the lower or leading part 7 of the rod having a greater pitch than the threads on the upper part 6. The axial extent of the leading part 7 is preferably limited to the ratio of 360° to the number of threads.

When the control rod 3 is being thrust into the bulk charge of spherical reaction elements it rotates, either to the right or to the left, depending on the direction of the threads, and the spherical reaction elements 4 are thrust aside by the screw threads. Due to the rotation of the rod the thread of greater pitch on the leading part 7 of the rod applies a lifting thrust to the spherical reaction elements engaged by it and this makes it easier for any element which happens to be directly in line with the axis of the rod to escape sideways. Consequently the spherical reaction elements are not greatly stressed mechanically and no major bending stresses are applied to the control rod. In this regard the reactor in accordance with the invention has the particular advantage, compared with conventional reactors of a similar type, that during the movements of the rods the reaction elements are not compacted and are retained sufficiently loose to prevent them from suffering damage due to excessive mechanical stressing. Friction between the reaction elements is considerably reduced by choosing a suitable cross section for the threads on the control rods. For example the threads may be a modified round thread as shown in FIG. 2.

FIGS. 3 to 6 illustrate two further examples in accordance with the invention. In both cases the control rods are guided and driven as already described above for FIG. 1. The differences between these further examples and that of FIGS. 1 and 2 lies in that the threads on the lower end part 7 of each rod are replaced by means which is equivalent to threads of infinite pitch, the threads on the upper part 6 remaining the same.

Figure 4:
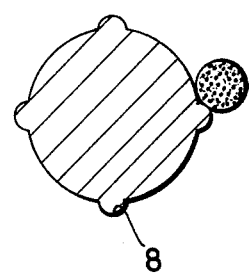
FIG. 4 is a cross section taken along the line IV—IV in FIG. 3.

In the example shown in FIGS. 3 and 4, the lower end part 7 of the rod 3 has ribs 8 projecting outwards from the surface of the rod and extending parallel to the longitudinal axis of the rod. The ribs 8 may be formed integrally from the material of the rod or if desired they may be in the form of strips welded to the lower part 7 of the rod.

Figure 5:
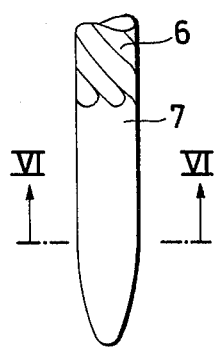
FIG. 5 is a side elevation of the lower or leading part of yet a different form of control rod; and, FIG. 6 is a cross section taken along the line VI—VI in FIG. 5.
Figure 6:
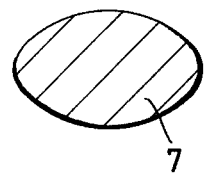

In the example shown in FIGS. 5 and 6 the lower end part 7 of the rod is elliptical in cross section (FIG. 6), the difference between the two axes of the ellipse having a similar effect to the ribs 8 of the example shown in FIGS. 3 and 4 in that when the rod is penetrating between the spherical reaction elements the lower end part 7 is effective in displacing the spherical reaction elements and loosening up the bulk charge when the rod is rotated by the engagement of the threads 6 and the charge. Instead of an elliptical cross section the lower end part 7 of the rod may if desired have a polygonal cross section.

We claim:

1. In a nuclear reactor having a bed of spherical reaction elements forming a core, at least one axially elongated absorber control rod, and means connected to said control rod for inserting and withdrawing said rod in the axial direction into and out of the core, wherein the improvement comprises that said control rod as it is inserted into the core by said means contacts the reaction elements directly, said means is connected to said rod for moving said control rod only in the rectilinear direction into and out of the core in the axial direction of said control rod and wherein the connection of said rod to said means permits rotation of the rod about its longitudinal axis in response to the direct contact of the control rod with the spherical elements independent of the rectilinear movement provided by said drive means, said control rod having an external surface which contacts the reaction elements and said external surface has an axial length with the actual axial length of said external surface in contact with said reaction elements being variable based on the extent to which said control rod is inserted into said core, said axial length consists of a lead-in portion which extends for a substantial portion of said total axial length of said control rod which can contact the reaction elements from the end thereof which first enters the core as the control rod is inserted into the core and a remaining portion which extends axially from the trailing end of said lead-in portion and follows said lead-in portion as it is inserted into the core, the circumferentially extending said external surface of said lead-in portion has a varying radial dimension from the longitudianl axis of said control rod so that the reaction elements are deflected outwardly away from said control rod as it is displaced axially within said core, said remaining portion of said control rod has an axially extending thread means, and said thread means on said remaining portion comprises a screw thread formed continuously about the circumferential periphery of the external surface of said remaining portion so that the moving contact between said screw thread and the reaction elements caused by the movement of said control rod by said means effects the rotation of said control rod.

2. A reactor, as set forth in claim 1, wherein the circumferential surface of said lead-in portion comprises an axially extending cylindrically shaped surface and a plurality of laterally spaced ribs extending in the axial direction of said control rod and projecting outwardly from said cylindrical surface.

3. A reactor, as set forth in claim 1, wherein the circumferential surface of said lead-in portion comprises an axially extending section having a transverse oval-shaped cross section.

4. A reactor as set forth in claim 1, wherein the circumferential surface of said lead-in portion comprises a first thread means, said first thread means comprises a first screw thread, said first screw thread formed continuously about the circumferential periphery of the external surface of said lead-in portion, and said first screw thread has a pitch greater than the pitch of said screw thread on said remaining portion.

5. In a nuclear reactor having a bed of spherical reaction elements forming a core, at least one axially elongated absorber control rod, and means connected to said control rod for inserting and withdrawing said rod in the axial direction into and out of the core, wherein the improvement comprises that said control rod as it is inserted into the core by said means contacts the reaction elements directly, said means is connected to said rod for moving said control rod only in the rectilinear direction into and out of the core in the axial direction of said control rod and wherein the connection of rod to said means rotation of the rod about its longitudinal axis in response to the direct contact of the control rod with the spherical elements independent of the rectilinear movement provided by said means, said control rod having an external surface which contacts the reaction elements and said external surface has an axial length with the actual axial length of said external surface in contact with said reaction elements being variable based on the extent to which said control rod is inserted into said core, said axial length consists of a lead-in portion which extends for a substantial portion of said total axial length of said control rod which can contact the reaction elements from the end thereof which first enters the core as the control rod is inserted into the core and a remaining portion which extends axially from the trailing end of said lead-in portion and follows said lead-in portion as it is inserted into the core, the external surface of said lead-in portion has a first thread means, the external surface of said remaining portion of said control rod has a second thread means, said first thread means comprises a first screw thread, said first screw thread formed continuously about the circumferential periphery of the external surface of said lead-in portion, said second thread means comprises a second screw thread formed continuously about the circumferential periphery of the external surface of the remaining part of said control rod, and said first screw thread has a pitch greater than the pitch of said second screw thread.

* * * * *